Feb. 2, 1965  R. W. BROKAW  3,168,683
CONTROL UNIT STRUCTURE
Filed Oct. 2, 1961  3 Sheets-Sheet 1

INVENTOR.
ROBERT W. BROKAW
BY John B. Sponsler

Feb. 2, 1965    R. W. BROKAW    3,168,683
CONTROL UNIT STRUCTURE
Filed Oct. 2, 1961    3 Sheets-Sheet 2
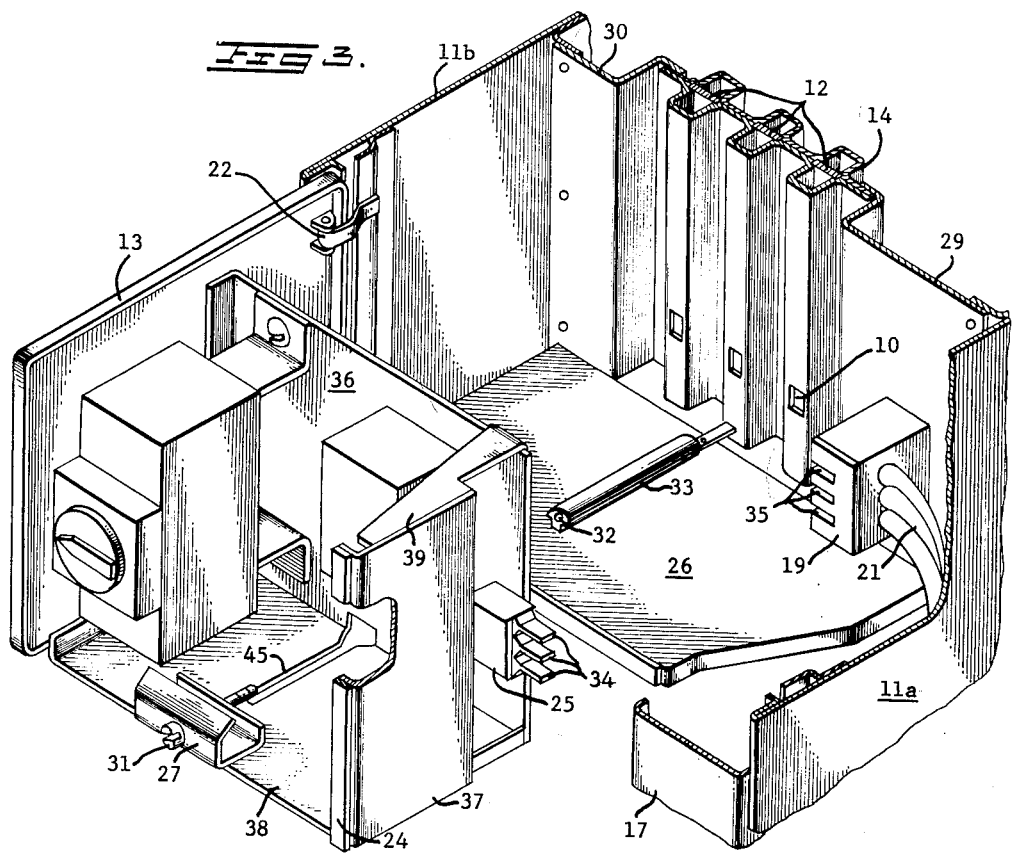
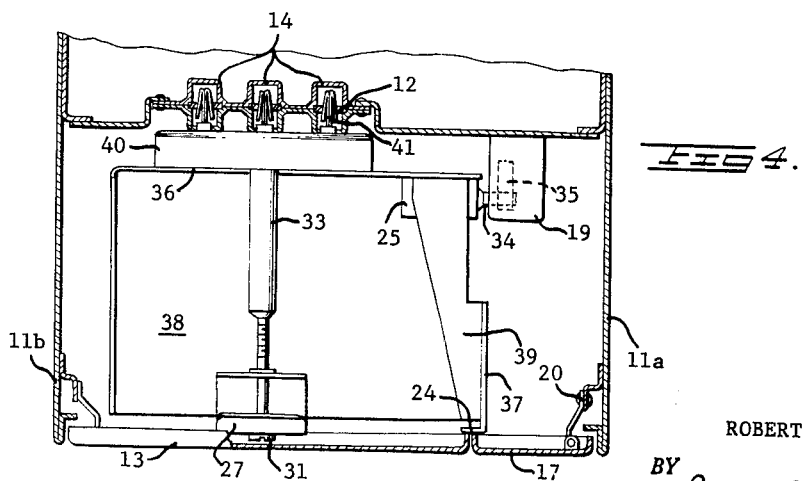
INVENTOR.
ROBERT W. BROKAW
BY John B. Sponsler

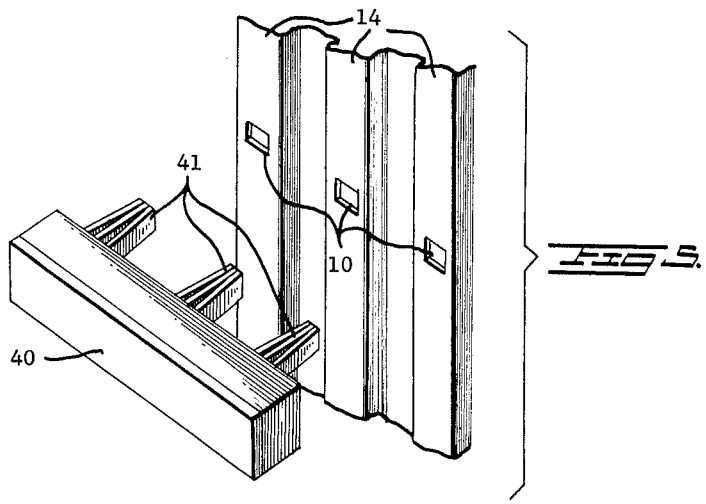
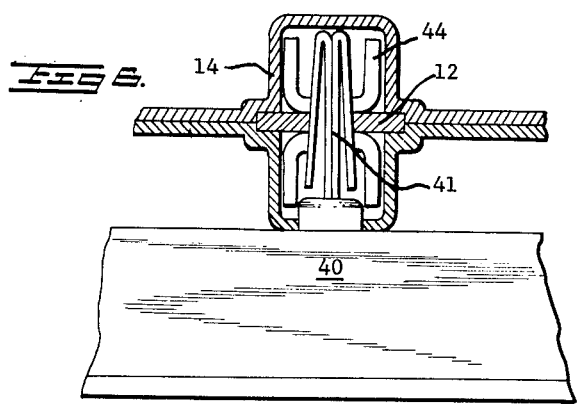
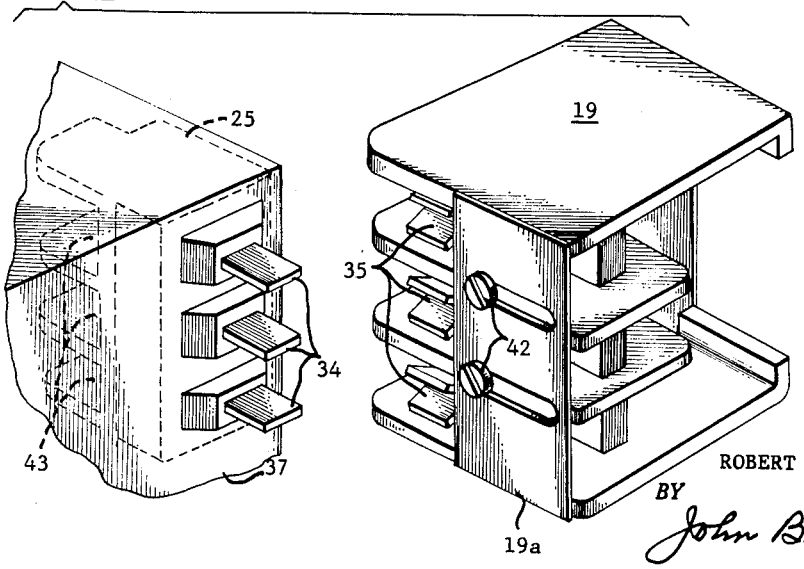

United States Patent Office 3,168,683
Patented Feb. 2, 1965

3,168,683
CONTROL UNIT STRUCTURE
Robert W. Brokaw, Roanoke, Va., assignor to General
Electric Company, a corporation of New York
Filed Oct. 2, 1961, Ser. No. 142,340
4 Claims. (Cl. 317—119)

This invention relates to electrical distribution systems, and, more particularly to an electrical control unit structure useful in the distribution and control of electrical energy in industrial apparatus.

Conventionally electrical energy is delivered to industrial plants and the like at utility transmission voltages, stepped down through transformers to distribution buses, from which connections to individual electrical devices are made through switchboards and similar control panels. Frequently new electrical power apparatus is installed in existing industrial plants where space is at a premium and where numerous additions are made from time to time or where new installations require prompt operations to begin. It has been found advantageous to make use of modular types of distribution panels, cabinets and the like in situations of this kind or where existing switchboards are inadequate. This type of modular distribution device comprises a cabinet having internal buses and compartmented spaces within each module or cabinet so that distribution to individual electrical equipment can be made independently and without having to shut down operations when changes or maintenance services are required upon single electrical control units contained in one or more of the compartmented spaces. An example of an electrical control cabinet of this type is shown in a design patent issued to the assignee of the subject application July 31, 1962 (Des. 193,301). Safety considerations are at a premium in instances of this kind as well as flexibility in being able to work upon control apparatus in one compartment without disturbing an adjacent control unit in another compartment.

The present invention is directed to a unique control unit structure that provides a maximum of flexibility and safety while at the same time permitting simple and rapid changes to be made, or maintenance operations to be carried out, without interrupting the service of any other control or distribution device. Very briefly the invention is concerned with a control unit structure that permits the control unit to be removed for repairs or changes and another unit substituted immediately without the necessity of interrupting operating conditions on another unit or circuit.

It is an object of this invention to provide an improved control unit for electrical distribution having maximum flexibility for installation.

Another object of this invention is to provide an electrical control unit for electrical apparatus having both power and control connections which are automatically disconnected when the unit is withdrawn from its normal operating position.

Still another object of this invention is to provide a novel electrical control unit structure wherein the maximum of access to both power and control circuits is provided with assured safety to operating and maintenance personnel.

The novel features of the invention are set forth with particularity in the appended claims. The invention itself, however, both as to its organization and method of operation, together with further objects and advantages thereof, may best be understood by referring to the following description and the accompanying drawings.

In the drawings:

FIGURE 3 is a perspective view of a control unit and its associated compartment, together with its power and control connections.

FIGURE 4 is a sectional view of the cabinet of FIGURES 1 and 2 including a control unit in operating position and the protective doors which cover the unit.

FIGURE 5 is a perspective detailed view of the control unit's connections to the power buses.

FIGURE 6 shows a sectional view of one of the power bus connections illustrated in FIGURE 5.

FIGURE 7 is a perspective view of the control circuit connections and the manner in which the control circuits are connected to the control unit.

Figure 1:
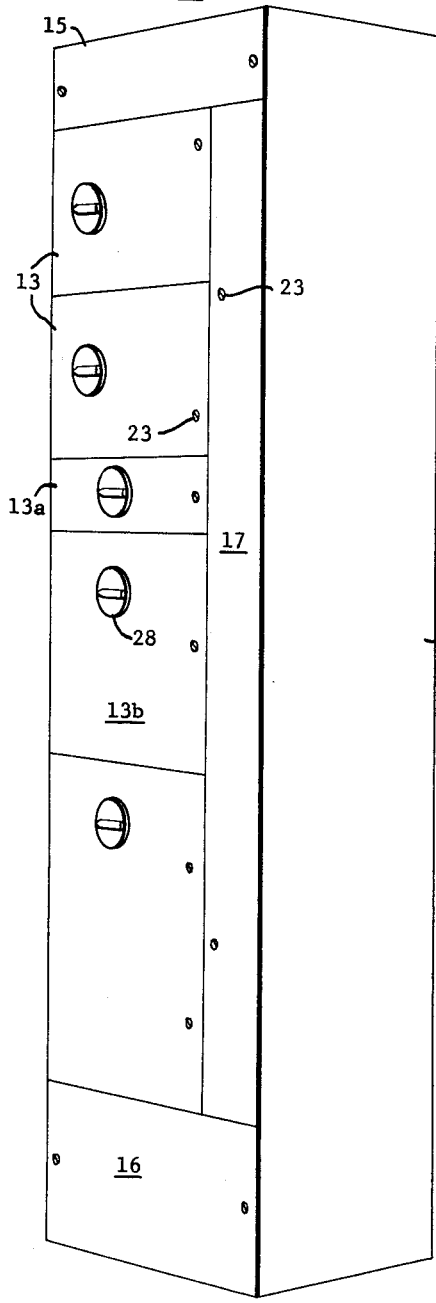
FIGURE 1 is an external, perspective view of a modular control unit cabinet.
Figure 2:
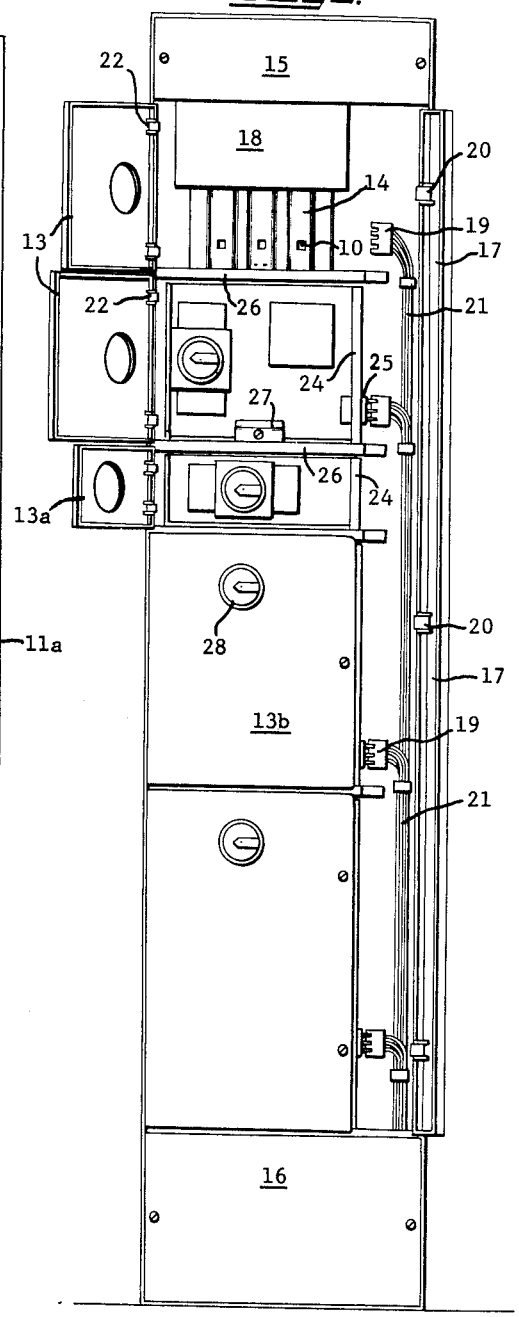
FIGURE 2 is a front elevation view of the cabinet shown in FIGURE 1 including fragmentary views of the internal structure as well as the arrangement of the control units therein.

Referring to FIGURES 1 and 2 there is illustrated a vertically extending modular cabinet of which the top and bottom, sides, and back are formed from smooth panels similar to the side panel 11a. The front of the cabinet is comprised of a top plate 15 and a bottom plate 16 with hinged doors 13, 13a, 13b of different vertical lengths and a single hinged door 17 covering the space between the plates 15 and 16. The doors 13, 13a, 13b and 17 are attached by hinges 20 and 22 to the side panels 11a and 11b (see FIGURES 3 and 4) so that they open outward (as in FIGURE 2). Holes are provided in the doors 13, 13a and 13b for the protrusion of control handles (for switches and the like, not shown) such as at 28. Latches (not shown) may be provided, the latch on a door 13, 13a or 13b engaging a slot in door 17, and vice versa, the latches being turned by screws 23 as indicated in FIGURE 1.

Referring now to FIGURES 3 and 4, fixed between the side panels 11a and 11b, and toward the rear of the cabinet, there are arranged plates 29 and 30 which support between them a multiple busway envelope having separated busways 14, in each of which is supported a bus 12. The buses 12 extend vertically from an input header 18. The busway is made of insulating material so that it not only supports each bus 12, but also isolates each bus from the others. Apertures 10 are provided in each busway 14, as well as in the buses 12, to receive electrical probes 41 for making connections to the buses. The busway construction is no part of this invention, but is the subject of copending applications Serial Numbers 80,112, now Pat. No. 3,096,131, and 135,880, filed respectively on January 3, 1961, and September 5, 1961, assigned to the assignee of the subject invention. Attached to the plate 29 is an insulated block 19 having clips 35, which is explained at greater length later herein.

It has been noted that the doors 13, 13a and 13b (see FIGURES 1 and 2) are of different vertical lengths. These lengths are chosen to correspond with the vertical dimension desired corresponding to the vertical dimension of a control unit to be inserted into the cabinet; i.e., these doors cover substantially the front of their respective control units. Consequently a barrier 26 is provided for each control unit compartment, extending from the side panel 11b and the plates 29 and 30 and fixed thereto. The barrier 26 not only provides isolation between compartments, but also acts as a supporting floor for each control unit. Secured to each barrier 26 is a tubular track 33 having a threaded portion 32 at its forward end. The barrier 26 does not extend to the panel 11a (see particularly FIGURE 3) thereby providing a clearance for wiring and cables such as illustrated at 21, the openings in the barriers 26 being covered substantially by the door 17.

Each control unit, which may carry not only switches, circuit breakers, reactors, resistors, transformers, contactors and the like, but also instruments and meters, is comprised of a floor plate 38, a back plate 36 and a side plate 37 (see FIGURES 3 and 4) as shown in FIGURE 3. The side plate 37 has its forward edge turned to form a lip 24, which, when the control unit is in place for operating, provides a stop for both the unit doors (13, 13a, 13b, etc.) and the wiring channel door 17 (see FIGURE 4). The plate 37 also provides a barrier between the unit's control apparatus and the wiring channel carrying cables 21 (see also FIGURE 2). However, when all of the control units are removed (note that the top compartment covered by door 13 in FIGURE 2 has its control unit withdrawn) there is no obstruction to access for wiring purposes along the line of door closure. For purposes of rigidity a brace 39 may be attached to the top edge of plate 37.

The floor plate 38 of each control unit is provided with a slot 45 which coacts with the tubular track 33 on the barrier 26 so that proper alignment of the control unit in its compartment is obtained, the control unit being slid along the track 33 guided by the slot 45. At the forward edge of the floor plate 38 of the control unit is a bracket 27 which carries a slotted screw 31 arranged to engage the threaded portion 32 of the tubular track 33, the screw 31 being held in the bracket 27 in a manner to prevent axial movement of the screw per se. On the back of the plate 36 of the control unit is a block 40 (see FIGURE 4) which carries electrical probes 41, suitably insulated from the block and from each other by bushings or similar means and each probe 41 having a connecting means (not shown) on the inside of the control unit extending through the plate 36. Attached near the right edge of the plate 36 of each control unit is an insulated terminal block 25 which carries a plurality of conductive fingers 34 (see also FIGURE 7) having means at 43 for making connections thereto from electrical components carried in the control unit. In some instances the plate 37 of the control unit may be extended to the rear against plate 36 so that the block 25 projects its fingers 34 as illustrated in FIGURE 7.

The construction of the block 19 is illustrated in FIGURE 7. This construction includes a series of clips 35 suitably insulated from each other, each clip having means for connecting cables thereto as indicated in FIGURE 2. A slide 19a may be attached at the front of the block 19 by means of screws 42, the slide serving the dual purpose of providing a barrier over the cable connections (in the position shown) and as a means for preventing the clips 35 to become electrically engaged when the slide 19a is moved to its other extremity. The clips 35 are so arranged to permit the insertion of the fingers 34 of the block 25 on the control unit to provide electrical connections therebetween.

FIGURES 5 and 6 illustrate the details of the electrical probes 41 and their coaction with the buses 12 carried by the busways 14. Each probe 41 extends from the block 40 for making electrical contact with a bus 12 through the busway 14 via apertures 10, which, as indicated in FIGURE 6 are of larger size in the busway than in the bus 12. The probes 41 are of spring type construction to provide a "stab" into the buses 12. The capacity of the buses 12 for carrying current may be increased by providing additional U-shaped auxiliary bus extensions 44 (FIGURE 6) in the busways 14.

Referring now to FIGURES 2, 3 and 4, it is readily understood that normally the electrical input (from the buses 12) into each control unit is provided by the probes 41 while the electrical output or distribution from each control unit is provided from each control unit by the fingers 34, the latter contacting the clips 35 in the block 19 and the cables or wiring 21 leading therefrom. Consequently when the control unit is inserted into its compartment, guided by the slot 45 and the coacting tubular track 33, the probes 41 enter the apertures 10 in the buses 12 and at the same time the fingers 34 engage the clips 35, thereby automatically providing all of the electrical input and output connections for each control unit. Since the entry of the probes 41 and the fingers 34 is resisted by the spring tensions of the probes and the clips 35, the movement of the control unit into operating position may be assisted by the screw 31 engaging the threads 32 of the tubular track 33. As the screw 31 is turned the control unit is moved into its "home" position and securely locked thereby. Conversely when a control unit is to be withdrawn from its compartment the screw 31 serves to initially overcome the spring tension of the electrical connections and to unlock the control unit from its compartment. A detailed description of this structure is shown in a copending application Serial Number 137,907 filed September 13, 1961, now Pat. No. 3,142,003, assigned to the assignee of the subject application. This arrangement provides a simple and reliable means for ensuring safety of operating and maintenance personnel while at the same time effecting positive electrical connections between the control unit and its input and output.

As has been pointed out, when the control units are withdrawn all of the compartment interiors (behind the door 17) are free for the installation of wiring; consequently, ready access is provided for installation and repair or changes of wiring connections. No door stops are integral with the cabinet, the control units providing such means by virtue of the turned over edges of the plates 37 at the lips 24. Any control unit may be withdrawn merely by opening its corresponding unit door without disturbing or touching in any way the associated cables or wiring by which it makes distribution. On the other hand access to the wiring or cables may be had by merely opening the wiring channel door without in any manner disturbing the control units. Ready access is thereby provided with the maximum of safety to all components of the control unit structure. Control units may be replaced in a manner of seconds merely by opening control unit doors with a consequent reduction in down time normally encountered in distribution structures previously known in the art.

While this invention has been explained and described with the aid of a particular embodiment thereof, it will be understood that the invention is not limited thereby and that many modifications will occur to those skilled in the art. It is therefore contemplated by the appended claims to cover all such modifications as fall within the scope and spirit of the invention.

What is claimed is:

1. An electrical control unit structure comprising a modular enclosure having an opening for inserting a control unit, said enclosure including a first group of receptacles and a second group of receptacles, distribution wiring attached to one of said groups, said wiring being arranged in a predetermined space within said enclosure, a control unit adapted to be contained in said enclosure including electrical control apparatus and having input connectors to said apparatus for coacting with said first group and output connectors from said apparatus for coacting with said second group, means for detachably fastening said control unit in said enclosure so that all said connectors make electrical contact with all said receptacles simultaneously, a pair of hinged closures covering said opening, one said closure covering said unit and the other said closure covering said wiring space, and a member on said unit providing a common stop for said closures.

2. An electrical control unit structure comprising a modular enclosure having an opening for inserting a control unit, said enclosure including a pair of groups of receptacles, said receptacles being adapted for electrical connections thereto, a control unit adapted to be contained in said enclosure including electrical control apparatus and having input and output connectors for coacting respectively with said groups of receptacles, a barrier forming a part of said control unit for providing a space between a wall of said enclosure and said barrier for containing wiring to one of said groups of receptacles, means for detachably fastening said control unit in said enclosure so that all connectors make electrical contact with said receptacles simultaneously, and a pair of hinged closures covering said opening, one said closure covering the said unit and the other said closure covering the said space, the said closures being provided a common stop by an edge of the said barrier.

3. An electrical control unit structure comprising a cabinet having a plurality of barriers extending between the sidewalls thereof to form a plurality of open-ended enclosures therein for the insertion of control units, said barriers having portions cut away at one end providing an open channel adjacent one of said sidewalls, said channel extending through all said enclosures, a group of receptacles in each enclosure, said receptacles having terminals for electrical connections to wiring carried in said channel, a control unit adapted to be contained in each said enclosure including electrical control apparatus and having a group of connectors associated with said apparatus for coacting with said receptacles, means for detachably fastening each said control unit in each said enclosure so that said connectors make contact with said receptacles, a unit door for covering each control unit hinged upon one of said sidewalls, a channel door for covering the said channel hinged upon the other of said sidewalls, and a member upon each said control unit forming a common closure stop for each unit door and the channel door, whereby when said units are removed free access is obtained along the line of door closure for the introduction of wiring through said channel to said terminals.

4. An electrical control unit structure comprising a cabinet having a plurality of barriers extending between the sidewalls thereof to form open-ended enclosures therein for containing control units, said barriers having cutaway portions adjacent one of said sidewalls to provide a channel through all said enclosures, a group of electrical buses passing through all said enclosures, said buses being provided with apertures in each said enclosure for making electrical contact, a group of receptacles in each enclosure, said receptacles having terminals for electrical connections to wiring carried in said channel, a control unit for each said enclosure including control apparatus and having a group of probes connected to said apparatus for coacting with said apertures and a group of connectors electrically associated with said apparatus for coacting with said receptacles, each said control unit having an isolating baffle adjacent said channel, means for detachably fastening each said control unit in its respective enclosure so that said probes enter said apertures to contact said buses and said connectors contact said receptacles simultaneously, a unit door for covering each said control unit hinged upon one of said sidewalls, a channel door for covering said channel hinged upon the other of said sidewalls, and a turned over edge of said baffle forming a common closure stop for each said unit door and said channel door, whereby when said units are withdrawn from said enclosures free access is obtained along the line of door closure for the introduction of wiring through said channel to said terminals.

References Cited by the Examiner
UNITED STATES PATENTS

| | | | |
|---|---|---|---|
| 2,559,151 | 7/51 | Getzoff | 339—36 |
| 2,719,251 | 9/55 | Stewart | 317—99 |
| 3,052,820 | 9/62 | Kreekon et al. | 317—99 |

LARAMIE E. ASKIN, *Primary Examiner.*

JOHN F. BURNS, *Examiner.*